No. 764,369. PATENTED JULY 5, 1904.
J. B. PRUDHON.
MULTITUBULAR BOILER.
APPLICATION FILED DEC. 31, 1901.
NO MODEL.
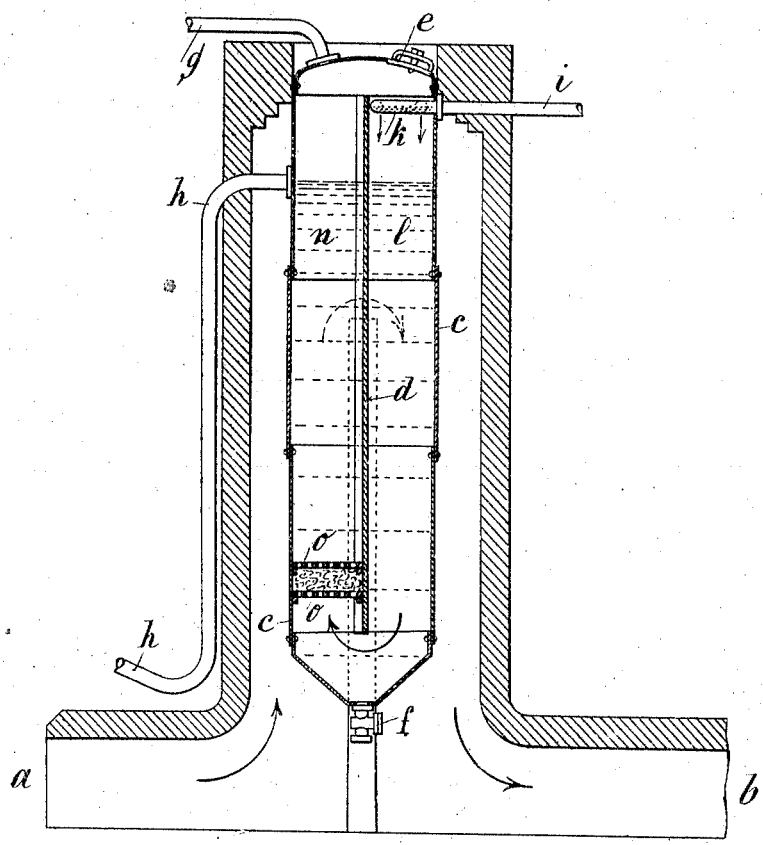

No. 764,369. Patented July 5, 1904.

UNITED STATES PATENT OFFICE.

JEAN BAPTISTE PRUDHON, OF MARSEILLES, FRANCE.

MULTITUBULAR BOILER.

SPECIFICATION forming part of Letters Patent No. 764,369, dated July 5, 1904.

Application filed December 31, 1901. Serial No. 87,947. (No model.)

*To all whom it may concern:*

Be it known that I, JEAN BAPTISTE PRUDHON, a citizen of the French Republic, residing at Marseilles, France, have invented certain new and useful Improvements in Feed-Water Heaters and Purifiers, of which the following is a full, clear, and exact description.

My invention has relation to feed-water heaters and purifiers; and among the objects in view is to provide a device of this character which shall be simple in construction and efficient in operation; and the invention consists in the novel construction, arrangement, and combination of parts as hereinafter fully described, illustrated in the drawing, and pointed out in the appended claim.

In the drawing I have illustrated by a vertical sectional view a feed-water heater and purifier constructed according to my invention.

The device is preferably located in a flue $a$ $b$, leading from the boiler-furnace to the stack or chimney, whereby the device will be heated by the outgoing products of combustion.

My device comprises a casing $c$, which may be cylindrical or other shape in cross-section and provided at the bottom with a sediment-cock $f$. I preferably construct the casing in sections, bolted together as shown. Arranged vertically within the casing is a partition $d$, the ends of which terminate short of the upper and lower ends of the casing, said partition dividing the interior of the casing into two chambers or compartments $l$ $n$.

The cold feed-water is admitted into one of the compartments of the casing, as $l$, through a pipe $i$, which leads into said compartment $l$ and terminates in a perforated coil $k$, whereby the feed-water will be fed into said compartment in the form of fine jets.

The cover of the casing is provided with an opening $e$ to give access to the interior of the said casing. Arranged within one compartment of the casing and preferably toward the lower end thereof is a purifying device, comprising perforated plates $o$, between which a filtering medium is located, whereby the feed-water prior to being admitted to the boiler will be filtered.

$g$ indicates a pipe adapted to lead from the steam-space of the boiler and into the upper end of the casing through the cover thereof, whereby the pressure of steam within the casing will be the same as that in the boiler.

The heated and purified feed-water is fed through a pipe $h$ into the boiler, with which said pipe communicates. The cold feed-water admitted through the pipe $i$ and discharged within the casing through the jets of the coil $k$ will be rapidly heated, and the salts, carbonates, and sulfates of lime generally contained in water being precipitated will fall to the bottom of the casing, where they may be removed through the cock $f$.

What I claim as new, and desire to secure by Letters Patent, is—

A feed-water heater comprising a casing and a partition arranged therein and dividing the same into two compartments, said partition terminating short of the lower end of the casing, in combination with a pipe adapted to conduct the feed-water into one of said compartments, the inner end of said pipe terminating in a perforated coil and means communicating with the other compartment of the casing and adapted to conduct the heated feed-water from said casing.

In testimony that I claim the foregoing I have hereunto set my hand this 17th day of December, 1901.

JEAN BAPTISTE PRUDHON.

Witnesses:
D. BERNARD,
JEAN E. VINERD.